United States Patent [19]
Belscher et al.

[11] Patent Number: 5,792,327
[45] Date of Patent: Aug. 11, 1998

[54] ADHERING METAL TO GLASS

[75] Inventors: Kay M. Belscher, Bath; Peter L. Bocko, Painted Post; LeRoy R. Morse, Campbell, all of N.Y.; Fumio Okamoto, Kanagawa, Japan

[73] Assignee: Corning Incorporated, Corning, N.Y.

[21] Appl. No.: 473,190

[22] Filed: Jun. 29, 1995

Related U.S. Application Data

[63] Continuation-in-part of Ser. No. 277,408, Jul. 19, 1994, abandoned.

[51] Int. Cl.⁶ ........................................... C23C 14/34
[52] U.S. Cl. .............................. 204/192.15; 204/192.26
[58] Field of Search ......................... 204/192.15, 192.26, 204/192.27, 192.28, 192.29, 192.22

[56] References Cited

U.S. PATENT DOCUMENTS

| | | | |
|---|---|---|---|
| 3,428,475 | 2/1969 | Teeg | 117/54 |
| 3,686,020 | 8/1972 | Palagos | 117/54 |
| 4,017,291 | 4/1977 | Gliemeroth et al. | 65/30 |
| 4,019,884 | 4/1977 | Elmer et al. | 65/30 |
| 4,415,404 | 11/1983 | Riegl | 156/635 |
| 4,477,364 | 10/1984 | Garcia | 252/142 |
| 4,555,304 | 11/1985 | Sälzle | 156/663 |
| 4,647,548 | 3/1987 | Klein | 204/192.29 X |
| 4,652,459 | 3/1987 | Engelhardt | 427/2 |
| 4,731,958 | 3/1988 | Kishishita et al. | 51/283 |
| 4,828,346 | 5/1989 | Jacobson et al. | 204/192.26 X |
| 4,832,988 | 5/1989 | Boenschütz et al. | 427/305 |
| 4,946,546 | 8/1990 | Moine | 156/643 |
| 5,049,414 | 9/1991 | Kato | 427/164 |
| 5,091,053 | 2/1992 | Blonder et al. | 156/657 |
| 5,102,691 | 4/1992 | Russo et al. | 427/109 |
| 5,200,024 | 4/1993 | Blonder et al. | 156/628 |
| 5,201,926 | 4/1993 | Szczyrbowski et al. | 204/192.27 X |
| 5,244,847 | 9/1993 | Kushitani et al. | 501/66 |
| 5,279,722 | 1/1994 | Szczyrbowski et al. | 204/192.27 X |

FOREIGN PATENT DOCUMENTS

| | | |
|---|---|---|
| 0 444 809 A1 | 9/1991 | European Pat. Off. . |
| 0 607 865 A1 | 7/1994 | European Pat. Off. . |
| 62-227130 | 10/1987 | Japan . |
| 3-107128 | 5/1991 | Japan . |
| 5-127014 | 5/1993 | Japan . |
| 7-206474 | 8/1995 | Japan . |
| 7-281007 | 10/1995 | Japan . |
| 7-286172 | 10/1995 | Japan . |

OTHER PUBLICATIONS

Spiering et al., "The dissolution. . . Solutions", Journal of Materials Science, 22 (1987) No. 5, pp. 1869–1874.

*Primary Examiner*—Nam Nguyen
*Attorney, Agent, or Firm*—Robert L. Carlson

[57] ABSTRACT

A method of improving adherence of a metal film deposited directly on a silicate glass substrate for a display panel. The method comprises chemically treating the surface of the glass to alter its surface characteristics and thereby improve adhesion robustness of the metal film to the glass surface. In a specific embodiment the surface is treated with a mixed solution of hydrofluoric and hydrochloric acid.

16 Claims, No Drawings

ADHERING METAL TO GLASS

This application is a Continuation-In-Part of U.S. patent application Ser. No. 08/277,408, filed Jul. 19, 194, titled "ADHERING METAL TO GLASS" abandoned.

FIELD OF THE INVENTION

Method of promoting adherence of a metal film deposited on a glass substrate in an electronic device.

BACKGROUND OF THE INVENTION

Production of electronic and opto-electronic devices may require depositing a metal film onto a glass substrate. This requirement is prevalent in producing devices employed in the rapidly growing field of display technology.

One application is production of thin film transistors (TFTs) for liquid crystal display (LCD) devices, in particular, active matrix (AMLCD) devices. In this application, the TFTs are produced on one glass panel of the display device. Another application in display technology is AMLCDs in which the active element is a diode of the Metal-Insulator-Metal (MIM) type.

The typical amorphous-silicon TFT configuration used in AMLCDs is the bottom-gate inverted structure. The first step in producing such a TFT configuration consists of depositing a barrier layer on one face of a thin glass sheet that forms a panel in the AMLCD device, and then depositing a metal film on top of the barrier layer. The metal film is then patterned by selective etching to form rows of conducting lines referred to as gate lines. These lines are electrically connected to a driver chip connected to the glass sheet.

The metal film may be deposited by any process known for this purpose. For example, one method of depositing the metal film for this purpose is by sputtering. Metal may be sputtered by a DC magnetron to deposit a film on a glass panel, the glass rising to a temperature of 200°–300° C. during the process. A metal film can be laid down at a rate greater than about 30 nm/minute by sputtering in an argon atmosphere at a pressure of less than 10 mT.

The advanced flat panel display industry is driving continuously and aggressively to lower cost and higher performance display products. As a result, AMLCD-manufacturers are aggressively pursuing means to eliminate process steps and increase line productivity. One example is the elimination of an oxide barrier layer between the substrate and overlaying TFT (thin film transistor) devices, enabled by the commercial availability of "alkali-free" glass substrates. Moreover, to achieve higher productivities on capital intensive TFT production lines, substrates and TFT structures are subjected to harsher process conditions, both chemical and thermal.

At the same time, increased display resolutions is an important performance trend, especially where finer TFT circuit structures are required. To maintain adequate conductance in gate conductors, thicker metal structures are desirable.

Some of these ensuing TFT panel design and process trends may eventually place greater demands on the glass substrate and overlaying device layers. It would therefore be desirable to increase the adhesion robustness of gate conductors which must be deposited directly on glass substrates, and thereby provide the AMLCD-maker with much greater design and process latitude for reducing costs and enhancing display performance.

It would further be desirable to achieve these results without visibly affecting the quality of the glass. Consequently, the light transmittance of the resultant glass sheet should remain as high as possible, while the light scattering inherent in the glass sheet should remain as low as possible. For this reason, methods which severely increase the roughness of the glass sheet, such as some of those methods which employ mechanical abrasion of the surface, should be avoided. In particular, those methods that result in an RMS surface roughness greater than 0.025 microns should preferably be avoided.

The present invention facilitates production of such displays by employing a silicate glass and chemically treating the surface of the glass to improve adherence of a metal film. Thereby, it provides an improved method of producing display devices, such as those employing a thin film transistor on a glass substrate.

SUMMARY OF THE INVENTION

The invention resides in a method of improving adherence of a metal film deposited directly on a silicate glass substrate for a display panel, comprising altering the surface of the silicate glass substrate by chemical treatment and depositing the metal film on the chemically altered surface of the silicate glass substrate. Using the methods of the present invention, these effects may be achieved without visibly altering the appearance of the glass. In addition, these results are achieved without having to use those mechanical abrasion techniques which result in severe abrasion to the surface of the glass, e.g., that which would cause an RMS surface roughness greater than 0.04 microns. Of course, it should be noted that the invention is still applicable to glass which has been mechanically surface polished (as float glass often is for flat panel display applications), as long as the surface roughness of the glass after polishing is not too great to make it unsuitable for flat panel display applications The invention further resides in a method of producing a thin film transistor on a silicate glass panel for an AMLCD device by depositing a metal film on the silicate glass panel and patterning the metal film to form electrically conducting gate lines, comprising chemically treating the surface of the silicate glass panel to improve adherence of the metal to the glass and depositing the metal film on the chemically treated surface of the silicate glass panel. The metal preferably is deposited using sputter deposition techniques.

DESCRIPTION OF THE INVENTION

The present invention relates to a method for depositing metal films onto glass surfaces. The method of the present invention is useful for depositing such films on all of the typical glass surfaces currently in use in the LCD industry today, including both as-formed and polished glass surfaces.

Sheet glass made by the Dockerty process (which is described, for example, in U.S. Pat. No. 3,338,696 and No. 3,682,609 (Dockerty)) is highly desirable because a relatively thin sheet can be produced with a pristine surface. This minimizes the weight in an article such as an LCD panel, and avoids the need for costly finishing steps such as polishing. Sheet glass produced by other processes, such as that known as the float process, is thicker. Also, it tends to be contaminated by the metal on which it is floated. Consequently, as currently produced, it must be ground and polished to produce an adequate panel.

It has been common practice in producing LCD devices to apply a barrier layer over the glass surface to avoid migration of alkali metal ions which tend to degrade an LCD device. Primarily, the barrier layers employed have been silica or alumina films. However, the advent of sheet glass compositions nominally free of alkali metal ions has led to a desire to omit the barrier layer film, in order to eliminate process steps and their associated costs in TFT production.

A standard ASTM test No. D3359-87 was employed to determine adhesion robustness of the films. This relatively severe test, which simulates surface conditions where mechanical defects exist, involves scribing each film to form a grid of small squares. Microscopic examination of the scribed edges revealed that adherence was dependent on buckling of the metal film. This was believed to be a result of the compressive stress developed in the metal film during deposition and cooling.

We have now found that adherence of a metal film to glass can be improved by a treatment of the glass surface with certain chemicals prior to deposition of a metal film on the surface. The chemicals must include i) a strong etchant, such as a fluorine-containing compound, that is, a source of active fluorine ion, and ii) an acid that leaches metals other than silica from the glass surface, such as the mineral acids, hydrochloric, nitric and sulfuric, as well as perchloric and a number of organic acids including acetic and citric.

A mixture of chemicals may be employed. A suitable mixture is a mixed acid solution of hydrofluoric acid (HF) and hydrochloric acid, which preferably is a mixed acid solution of 0.01–1M hydrofluoric acid (HF) and 0.1–6M hydrochloric acid (HCl), more preferably a mixed acid solution of 0.01–0.6M hydrofluoric acid (HF) and 0.1–2.5M hydrochloric acid (HCl).

The acid solutions should preferably be employed in accordance with the present invention so that they do not visibly alter the transmission or light scattering characteristics of the glass. The light scattering should be less than 1.0, preferably less than 0.5 percent, so that no visible haze will be apparent. Preferably, after exposure of the glass to the acid mixture, the glass exhibits a RMS surface roughness which is less than about 0.025 microns, more preferably less than about 0.01 microns, and most preferably less than about 0.009 microns. For comparison, Corning Incorporated Code 1737 glass typically has an as-formed RMS surface roughness of about 0.0003–0005 microns. Polished float glass which is used in LCD applications typically has an RMS surface roughness between 0.001–0.0012 microns.

It is our belief that, when the acid solutions of the present invention are contacted with such glasses, the active fluorine compound attacks the glass surface, thereby altering its chemical nature. A possible alteration involves converting Si—O bonds to Si—OH bonds. This may also be expressed as the breaking of a bridging oxygen bond between two silicon atoms to form two silanol (Si—OH) groups. The breaking of the oxygen bond may be thought of as catalyzed by the active fluorine. Schematically, this may be shown as:

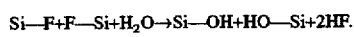

It appears that the metal adheres better to the chemically-altered surface, possibly due to creation of a gradient interface, or a metal oxide interlayer.

We believe that the effect of the acid leachant is to remove elements other than silica, such as alkali metal or alkaline earth metal, from the glass surface. This may roughen the glass surface, or chemically alter it, or, possibly, create both effects. It may be that removal of alkaline earth metals from the glass surface structure accelerates the action of the fluorine source in the mixed solution. In any event, compressive stress between the metal film and the glass is, in some manner, alleviated or accommodated.

The treatment of glass substrate surfaces with mixed acids in accordance with the present invention enhances the adhesion robustness of gate metals directly deposited on glass, and thereby enables greater design and process latitudes in the manufacture of Active Matrix Liquid Crystal Displays (AM-LCD's). This mixed acid treatment, which preferably is further supplemented by the use of more chemically durable glass, enhances adhesion robustness, both initially and over time. The mixed surface treatment markedly enhances both initial and aged adhesion on all commercial substrates tested, regardless of the mechanical surface condition, whether as-formed or polished. The use of more durable glasses further enhances aged adhesion, that increases resilience after protracted ambient exposure.

A recent publication by I-Wei Wu in *Journal of the SID*, 2/1, 1994, entitled "High-Definition Displays and Technology Trends in TFT-LCDs" reports metals used by various manufacturers in producing gate lines for AMLCD devices. These metals include aluminum, chromium, tantalum, molybdenum, and alloys thereof.

Analysis of most glass samples which have been sputter deposited with such metals after treatment with the acid solutions of the present invention indicate that a metal oxide layer is formed during the initial stages of sputter deposition. It is believed that this initial oxide layer is due to the altering of the surface chemistry discussed above. Preferably, the thickness of this oxide layer is between about 30 and 1000 angstroms, more preferably about 50–300 angstroms, and most preferably about 50–150 angstroms. After treating the glass using the acid solutions in accordance with the present invention, oxide layers in these thickness ranges can be sputter deposited using metals selected from group consisting of aluminum, chromium, tantalum and molybdenum-tantalum alloys. Surprisingly, these oxide layers can be deposited using sputtering atmospheres having less than 2 percent, and even less than 1 percent oxygen (preferably these layers are deposited in an oxygen-free atmosphere). The fact that such oxide layers can be deposited without a more strongly oxidizing atmosphere further supports the theory that the chemistry of the glass surface is altered with the acid solutions of the present invention. We have found that the coated glass products having such initial metal oxide layers have much improved adhesion compared to products which do not.

In one embodiment, the metal is deposited directly after the acid treatment. By "directly after", it is meant that the metal is deposited before any other processes which would substantially alter the surface chemistry of the glass (e.g., ion etching) are employed. In this way, the altered surface chemistry produced by contact with the acid solutions is at least substantially retained prior to the metal deposition process. An example of a subsequent process which would not substantially alter surface chemistry is water rinsing.

A screening test for initial adhesion of metal to glass involves sputter depositing a metal film on a clean glass surface to a required thickness, for example 300 or 500 nm thickness. This film is scribed with a sharp instrument to form a grid of small squares. A strip of cellophane tape with a pull force of greater than 25 ounces is then pressed firmly over the grid and pulled away. Depending on the number of metal squares removed from the grid, the adhesion is graded from 0 (>65% removed) to 5 (none removed).

Elevated temperature and humidity was used as a mean to accelerate delayed delamination and assess aged adhesion under aggravated conditions. In these tests, a scribed sample is placed in a test oven for 24 hours. The oven is maintained at 85±2° C. with an atmosphere of 85±4% relative humidity. The sample is then removed and tape tested as before. Alternatively, the sample is photographed at a magnification such that the edges of the scribed lines in the magnified photo can be examined for buckling.

Samples for glass testing were prepared from 1.1 mm thick glass sheet produced by the Dockerty downdraw process from a barium aluminosilicate glass as described in U.S. Pat. No. 5,374,595 to Dumbaugh et al. For treatment of these glass samples, acid solutions were prepared containing hydrofluoric acid in strengths varying from 0.05 to 0.6 molar and hydrochloric acid in strengths varying from 0.1 to 5.0 molar. The glass samples were dipped in the acid mixtures for times varying from 5 to 25 minutes. The time of treatment may be shortened by heating the treatment bath, or agitating the bath. The samples then had metal films purposely deposited at a greater than normal thickness of about 600 mm and scribed as described above.

Test results indicated that neither an HF acid solution, nor an HCl solution alone was entirely satisfactory. Rather, mixtures of the acids were more effective. Mixtures employing 0.1–0.5M HF and 0.1–5.0M HCl gave encouraging results with immersion times of 5 to 10 minutes. The treatment could also be sequential, that is, immersion in one acid followed by immersion in the other. However, this may be less desirable because of the additional steps involved.

Subsequent testing indicated that the concentration of HF in the chemical mixtures could be considerably diluted with equally effective results. Thus, solutions in which the HF strength was as low as 0.01M were successfully employed.

In order to test the mixed acid solutions on a commercial scale, commercial size panels that were greater than 300 mm wide and greater than 400 mm long by 1.1 mm thick were employed. These panels were cleaned and immersed in mixed acid baths for times of 2–10 minutes at ambient temperature (about 25° C.). These panels were immersed in acid solutions having concentrations of 0.1–0.5M HF and 1.0–2.5M HCl.

Individual schedules employed in the testing are set forth in the TABLE that follows.

TABLE

| Sample | Molar Concentration | | Time |
|---|---|---|---|
| | HF | HCl | (minutes) |
| 1 | 0.01 | 1.0 | 8 |
| 2 | 0.01 | 2.0 | 8 |
| 3 | 0.03 | 1.5 | 8 |
| 4 | 0.05 | 1.5 | 8 |
| 5 | 0.03 | 2.0 | 8 |
| 6 | 0.05 | 2.0 | 8 |
| 7 | 0.05 | 2.5 | 8 |
| 8 | 0.05 | 2.0 | 2 |
| 9 | 0.05 | 2.0 | 4 |
| 10 | 0.05 | 2.0 | 6 |
| 11 | 0.05 | 2.0 | 10 |

All of these samples resulted in acceptable adhesion, wherein there was no evidence of either immediate or delayed delamination. When Corning Code 1737 glass is treated using the solution of example 6, the RMS surface roughness typically is between about 0.0006 and 0.0008 microns.

The methods of the present invention have proven to be effective on a wide variety of commercial substrates, regardless of whether these glass surfaces were as-formed or surface polished. Testing of the method on different glasses indicates that properties of the glass substrate may have an influence on the effectiveness of the method. In particular, the inherent chemical durability of a given glass surface appears to be important. Durability in this case refers to resistance to glass dissolution which may be evidenced by weight change in an accelerated acid test.

A measure of glass durability is the loss in weight that occurs when a test sample of a glass is immersed in a 5% by weight solution of HCl for 24 hours at 95° C. Durability of the glass employed in the tests reported above was determined to be 0.05 mg/cm$^2$, a very favorable value. As indicated, this glass consistently provided excellent metal adherence after chemical treatment of its surface. In view of such tests, our method is successful on glasses having durability values under 5 milligrams/sq cm.

What is claimed is:

1. A method of improving adherence of a metal film deposited directly on a silicate glass substrate for a display panel, comprising:

exposing the glass substrate to a mixture of hydrofluoric acid and hydrochloric acid, said acid mixture is sufficient to increase the adhesion of metal to be deposited without visibly affecting the transmissive quality of the glass substrate; and sputter depositing the metal film of the surface of the silicate glass substrate.

2. The method of claim 1 which comprises chemically altering silicate bonds at the surface of the silicate glass substrate while resulting in a RMS surface roughness, after said exposing step, which is less than about 0.04 microns.

3. The method of claim 1 which comprises chemically altering silicate bonds at the surface of the silicate glass substrate while resulting in a RMS surface roughness, after said exposing step, which is less than about 0.01 microns.

4. The method of claim 3 which comprises exposing the silicate glass substrate to the mixed solution by immersing the substrate in a bath of the solution for 2–25 minutes at a temperature of about 25° C.

5. The method of claim 1 wherein the concentration of hydrofluoric acid in the mixed solution is 0.01–0.6M, and the concentration of the hydrochloric acid in the solution is 0.1–2.5M.

6. The method of claim 1, wherein the concentration of hydrochloric acid is 1–2.5M.

7. The method of claim 1, wherein said exposing step comprises exposing the glass substrate to a mixture of hydrofluoric acid and hydrochloric acid which is sufficient to increase the adhesion of the metal to be deposited while still enabling the light transmitting quality of the glass substrate to be suitable for LCD applications.

8. The method of claim 1 wherein the concentration of hydrofluoric acid in the mixed solution is about 0.05M, the concentration of hydrochloric acid is about 2.0M, and the time of exposure is about 8 minutes.

9. The method of claim 1 wherein the silicate glass substrate is chemically altered by consecutively exposing it to a hydrofluoric acid solution and a hydrochloric acid solution.

10. The method of claim 1, wherein the metal deposited on the chemically altered surface of the silicate glass substrate is selected from the group consisting of aluminum, chromium, tantalum, molybdenum, and alloys thereof.

11. The method of claim 10, comprising depositing a metal film on an alkaline earth metal boroaluminosilicate glass substrate.

12. The method of claim 11 wherein the silicate glass substrate has a weight loss less than 1.0 mg/cm$^2$ when immersed in a 5% by weight solution of HCl at 95° C. for 24 hours.

13. A method of improving adherence of a metal film deposited onto a silicate glass substrate for a display panel, comprising:

exposing the substrate to a mixed solution of hydrofluoric acid and a leachant acid selected from the group consisting of nitric, perchloric and organic acids in a concentration sufficient to increase the adhesion of metal to be deposited without visibly affecting the transmissive quality of the glass substrate, and depositing the metal film on the chemically altered surface of the silicate glass substrate using sputtering techniques.

14. A nonmechanically abrading method for improving adherence of sputter deposited metal films on glass substrates for display panel applications, comprising:

exposing the glass substrate to a mixed acid solution of HF and HCl in a concentration sufficient to increase the adhesion of metal to be deposited without visibly affecting the transmissive quality of the glass substrate to thereby alter the surface chemistry of the substrate, and sputter depositing the metal film on the surface of the glass substrate.

15. The method of claim 14, wherein said exposing step comprises exposing the substrate to a mixed acid solution of 0.01–0.6M HF and 0.1–2.5M HCl.

16. The method of claim 14, wherein said depositing step comprises sputter depositing the metal film on the surface of the glass substrate directly after said exposing step.

\* \* \* \* \*